United States Patent [19]

Knupp et al.

[11] 4,266,501
[45] May 12, 1981

[54] CAKE TRIMMING AND ICING LEVELLING AND SMOOTHING MEANS

[75] Inventors: Mary R. Knupp, 6100 Laurent 616-B, Parma, Ohio 44129; John Tymkewicz, Cleveland, Ohio

[73] Assignee: Mary R. Knupp, Parma, Ohio

[21] Appl. No.: 102,856

[22] Filed: Dec. 11, 1979

[51] Int. Cl.³ .............................................. B05C 17/00
[52] U.S. Cl. ........................................ 118/15; 118/18
[58] Field of Search .................. 118/13, 35, 14, 15, 118/18, 120; 426/297, 293; 52/365, 678; 425/87, 90, 458

[56] References Cited

U.S. PATENT DOCUMENTS

| 3,115,726 | 12/1963 | Sayles | 52/365 X |
| 3,420,210 | 1/1969 | Lindquist | 118/18 |

FOREIGN PATENT DOCUMENTS 889034  2/1962  United Kingdom ............. 118/14

*Primary Examiner*—John P. McIntosh
*Attorney, Agent, or Firm*—Frank B. Robb

[57] ABSTRACT

Means for trimming, icing levelling and smoothing of cakes or the like comprising a generally rectangular framework having posts at the four corners which adjustably receive frame rods and support instrumentalities so that the area within the framework can be adjusted to accept cakes of different sizes, the support instrumentalities being vertically adjustable and adapted to provide for movement of a screed-like member therealong to engage with the cake or icing thereon to smooth and level such icing or trim the cake to provide a suitable level surface for icing, indicia means being availed of to enable uniform positioning of the instrumentalities.

6 Claims, 7 Drawing Figures

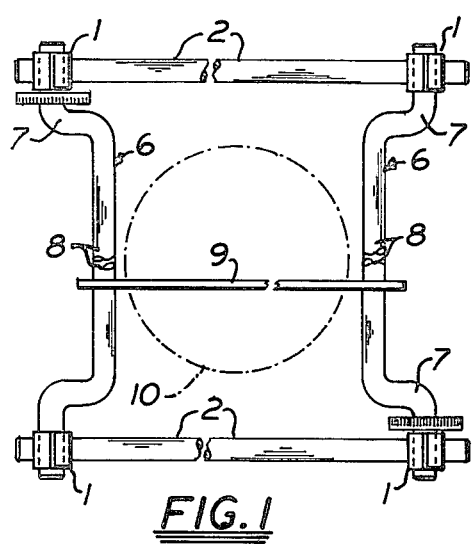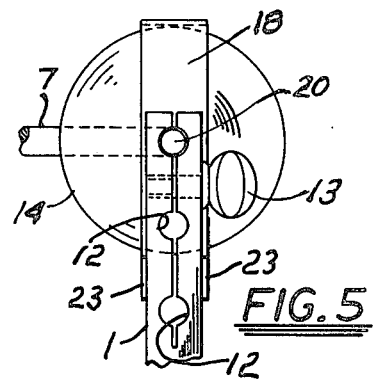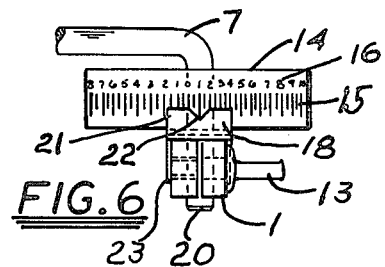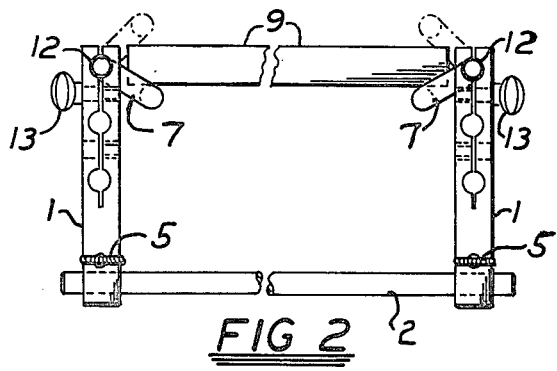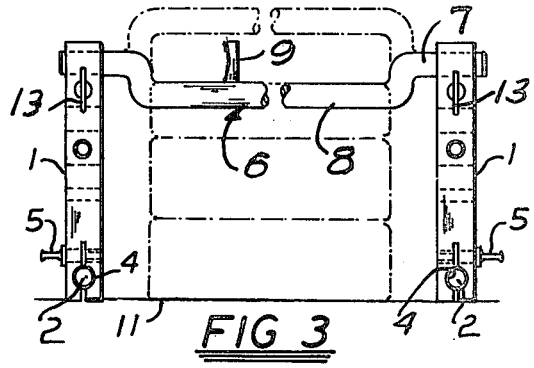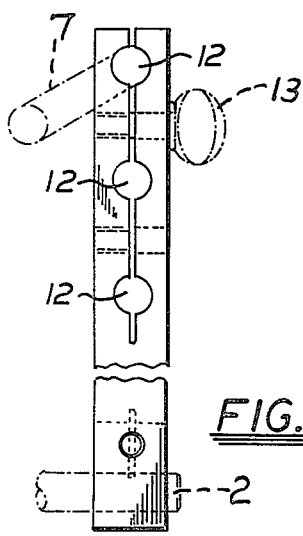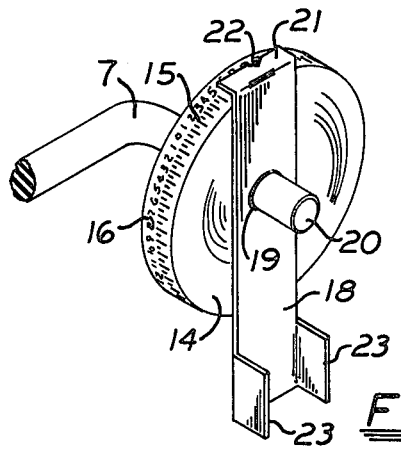

CAKE TRIMMING AND ICING LEVELLING AND SMOOTHING MEANS

BACKGROUND OF THE INVENTION

In the art of cake icing and trimming, it is often necessary to provide a relatively perfect surface either upon which to install the icing and smooth the same or to ultimately level the icing on the cake or other confection, such that it is desirable to have means for uniformly effecting such operations from time to time.

In addition to the general problem of dealing with cakes or like confections, it is obviously necessary to have means which are not only sanitary but easily adjustable to compensate for various types of cakes and various conditions existing in those cakes whether the same be round, square, rectangular or other shapes.

It is primarily desirable to have the upper surface of the cake level and smooth to accept icing as will be readily apparent to those skilled in the art.

To that end, the instant invention is directed to enable the uniform application of icing, to a cake for example in which the actual layer thereof is not even level at its upper portion when supported in a position for applying icing thereto. In this instance, it is desirable to trim the same as to the upper surface upon which such icing is to be applied and that is an important aspect of this invention as well as the necessity to install the icing or apply the same in a uniform coating over the cake so that in commercial applications the same may be effected to provide a pleasing appearance and at the same time not have the cake icing heavier or lighter in respective areas which would detract from the overall value of providing the cake and its serving.

The instant invention therefore includes sufficient means to not only facilitate disassembly of a device or means which will effect the previously suggested desired ends, but likewise make possible wide adjustment of the same to accommodate for various thicknesses of cake layers, and likewise various sizes of cakes, whether round, square, or rectangular which may be desirably operated upon in preparing the same and icing for ultimate use.

With that in mind, the invention comprises a framework which is essentially rectangular but adjustable, having upright posts upon which various means are supported, and which posts are adjustable to carry out the support, and the support in turn is arranged to carry and make possible the manipulation of a screed-like member which can either trim the cake positioned within the frame work, or subsequently and uniformly distribute the icing applied to the upper surface thereover, by smoothing and leveling the same when applied in the usual manner.

Having in mind the various objectives heretofore suggested, and which will be ultimately described in detail in the Specification appended hereto, the invention is disclosed in detail in the drawing wherein:

FIG. 1 is a top plan view showing the means hereof in its assembled position and with the screed-like member available for use in connection with a cake suggested as lying within the framework.

FIG. 2 is a view from one end of the structure to illustrate the actual elements comprising the same.

FIG. 3 is a side view showing certain other aspects of the structure.

FIG. 4 is a detailed view somewhat enlarged showing one of the corner posts.

FIG. 5 is a fragmentary enlarged view to suggest and show in greater detail certain of the indicia and reference means therefore.

FIG. 6 is a view from the top of FIG. 5 likewise fragmentary to further indicate the indicia and means for relating the same.

FIG. 7 is a perspective view showing additional detail of the indicia reference and bearing means provided.

DETAILED DESCRIPTION OF THE INVENTION

Referring now to FIGS. 1 and 2, the means for trimming, icing, and leveling and smoothing of cakes comprises a framework which is generally rectangular as suggested, including the corner post 1, of which there are four and which are identical, spaced as indicated at the four corners of the framework herein now being described.

The posts are in each case connected to frame rods 2 which in this instance are round rods, and engaged at the lower ends of the posts as suggested in FIG. 2, in suitable openings, FIG. 3 indicating that the posts 1 at their ends and at the openings 4 provided therein, arranged to clamp the ends of the respective rods 2 by means of thumb screws 5 provided in each case.

It will thus be seen that the posts 1 may be moved along the rods 2 to any preferred position and clamped in that position with the posts 1 in upright relationship to said rods.

Extending at right angles to the frame rods 2 described, are the support instrumentalities indicated at 6, being identical, and including in each case a pair of crank-like ends, each end being identical and therefore identified as 7.

The crank-like ends 7 are integral with as disclosed, the intermediate or center portion 8, which is of relatively long extent and adapted to support a screed-like member 9 for movement therealong, the support of the screed-like member being further shown in detail in FIGS. 2 and 3, as having a cross-section of rather flattened vee-shape, and maintained in generally vertical position by the hands of the operator.

It will be apparent from the foregoing that when the portions 8 are suitably positioned, and the screed 9 may be moved along the same, and if a cake such as suggested in dotted lines at 10 is arranged beneath the frame on a suitable surface such as is suggested at 11, the screed-like member 9 may be used to trim the cake surface for example if it is not level in the beginning of the operation here suggested.

It is obvious that by adjustment of the crank arrangement of the support instrumentalities, these instrumentalities at their crank-like ends being supported as shown in FIG. 2 in suitable openings 12, with the thumb screws 13 provided to maintain said instrumentalities in any adjusted position desired so that the screed-like member 9 may be moved therealong to strike the top of the cake if necessary or to level or smooth frosting applied thereto in a manner which will be apparent to those skilled in the art.

The purpose of the crank-like parts 7 is of course to enable the adjustment of the portions 8, and since it is also desirable to have these portions adjusted uniformly, indicia means shown only in certain views may be provided.

Adjacent one of the ends of each of the support instrumentalities at the crank-like portion, is provided a suitable round indicia bearing element generally denoted 14 as shown in detail in the perspective view of FIG. 7, which is a disc essentially and upon the periphery of which are certain indicia indicating elements such as 15 which may be associated with suitable numbers such as are indicated at 16 thereon in each case the numbers obviously being desirably related to the crank-like portion 7 so that uniform relationship between spaced crank-like portions may be determined.

With the indicia bearing element 14 fixed with relationship to the crank-like portion, it is desirable to have a reference part and to that end the part shown in the figures is provided including a part 18 mounted through an opening 19 on the end 20 of the respective support instrumentalities and specifically of course the crank-like end thereof.

At the upper portion as shown in the respective figures, an inturned section 21 is provided with a notch of vee form, indicated at 22 to reference the indicia mark 15 previously mentioned.

To maintain this part 18 in fixed position, the ears 23 are arranged to receive a post therebetween, thus obviously as indicated in FIG. 5 for example maintaining this part 18 upright so that the vee 22 may be observed by the user and suitable adjustment made if necessary of each of the support instrumentalities to make them correspond.

It should be noted that the posts 1 are provided with a series of round openings, there being only one opening 4 in each case required since the frame rods 2 are desirably at the lower most ends of the posts in each case and maintained there without necessity for adjustment except as the post may be adjusted along the rods as previously initially indicated.

It will be apparent from the foregoing that all the respective parts are easily disassembled, so that sanitary requirements may be met of maintaining the respective parts suitably clean for use, the parts where necessary being made of stainless steel or the like to make possible suitable cleansing and maintaining of the same in sanitary condition.

I claim:

1. Means for trimming, icing levelling, and smoothing of cakes, comprising a framework within which a cake to be treated is positioned, said framework including upright corner posts rectangularly spaced in pairs, each pair being connected to a frame rod at spaced intervals thereon to constitute a frame end, which ends are arranged in spaced relation and generally parallel, a pair of substantially parallel support instrumentalities connecting the corner posts at about right angles with respect to the frame rods aforesaid, said support instrumentalities including means for adjusting the same vertically, said instrumentalities being arranged to support a screed-like member thereon for movement along the support instrumentalities for trimming, icing levelling and smoothing a cake positioned as stated.

2. Means as claimed in Claim 1, wherein the corner posts are adjustably connected to the rods and support instrumentalities to facilitate assembly and disassembly of the same and to vary the area within the framework to accept cakes of different sizes and shapes.

3. Means as claimed in claim 2, wherein the posts include vertically spaced openings to receive the rods and support instrumentalities, and are formed to facilitate adjustable clamping of the same therein.

4. Means as claimed in claim 1, wherein the support instrumentalities each include a pair of crank-like ends, which ends are supported by the posts, the portion therebetween supporting the screed-like member for the movement specified, and the crank-like ends permitting vertical adjustment of the said portion of each instrumentality, whereby the screed-like member may be moved along said portion in variously adjusted positions.

5. Means as claimed in claim 4, wherein each of the instrumentalities is rotatably supported at its crank-like end in the posts referred to, and indicia and reference means are provided for each instrumentality whereby the portions may be positioned in predetermined relation and adjustably maintained thereat.

6. Means as claimed in claim 4, wherein each of the instrumentalities is rotatably supported at its crank-like end in the posts referred to, and indicia and reference means are provided for each instrumentality whereby the portions may be positioned in predetermined relation and adjustably maintained thereat, said indicia and reference means comprising an indicia bearing element fixed to rotate with a crank-like end of each instrumentality, and an indicia reference part is fixed with respect to a post and arranged to provide indication of position of the crank-like end, whereby the portions of the instrumentalities upon which the screed-like member is supported for movement may be related to each other.

* * * * *